United States Patent Office.

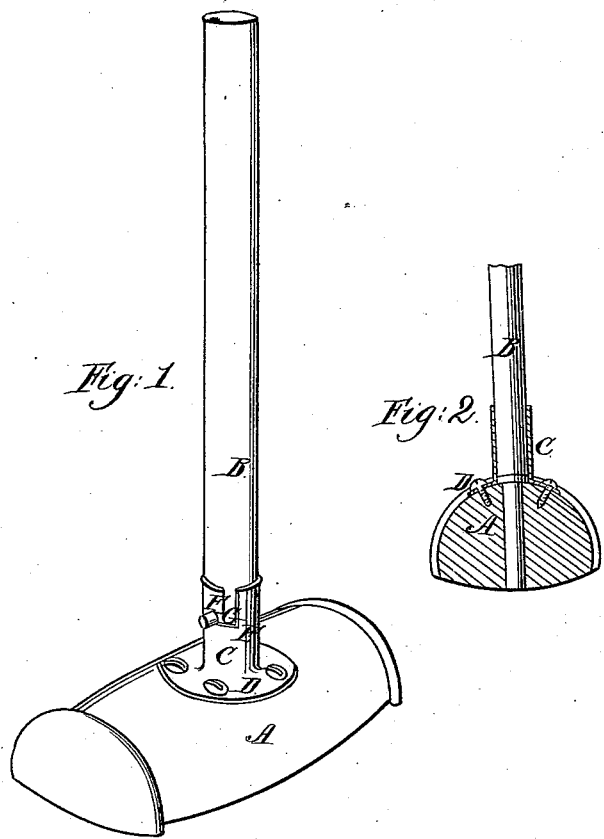

ANNA EDDOWES, OF FRANKFORD, PENNSYLVANIA.

Letters Patent No. 61,658, dated January 29, 1867.

---

IMPROVED ATTACHMENT FOR HANDLES TO BRUSHES, BROOMS, &c.

---

The Schedule referred to in these Letters Patent and making part of the same.

---

TO ALL WHOM IT MAY CONCERN:

Be it known that I, ANNA EDDOWES, of Frankford, in the county of Philadelphia, and State of Pennsylvania, have invented a new and improved Attachment of Handles to Brushes and other implements; and I do hereby declare that the following is a full, clear, and exact description thereof, which will enable others skilled in the art to make and use the same, reference being had to the accompanying drawings, forming part of this specification.

The present invention consists in securing the handle to the heads of brushes of all descriptions, such as sweeping or broom-brushes, white-wash brushes, etc., and to garden tools and other implements, which are not subject to heavy strains, in such manner that while a firm, secure, and reliable fastening is obtained, the handle can be readily detached when so desired, and again, or a new one, attached.

In the accompanying plate of drawings my improvement is illustrated—

Figure 1 being a perspective view of a brush-head, having its handle attached thereto according to the present invention; and Figure 2 a transverse vertical section through the cross-head, showing handle in side elevation.

Similar letters of reference indicate like parts.

A, in the drawings, represents the head of the brush, and B the handle, which is secured to the said head as follows: C a socket-tube, secured by its ear or flange piece, D, at one end to the top of the brush-head A, at or near its centre, and in a position at right angles to the same. G, two slots formed in the upper end of the socket-tube C, one upon each and opposite sides of the same. These slots are right-angular in shape, with the horizontal portion, E, of each extending in opposite directions to each other. F, pins or studs inserted in the handle B, near one end of the same, which pins enter the slots of the socket-tube, and passing into the horizontal portions E of the same by turning the handle in the proper direction, thereby holds the handle from becoming disengaged by any strain or pull upon it in the direction of its length, while at the same time it allows the handle to be readily detached if so desired. To strengthen the attachment above described of the handle to the brush-head, by relieving the socket of side lateral strains, I bore out the brush-head through its thickness in a line corresponding to the line or direction of the socket-tube, but of a smaller diameter thereto, so as to allow the handle, suitably formed therefor, to extend through and into the brush-head, as plainly shown in fig. 2 of the drawings, whereby the desired result is attained.

I claim as new, and desire to secure by Letters Patent—

The handle B, with its lower portion contracted and passing entirely through the head A, its enlarged portion fitting in the socket-tube C, having right-angular slots G, receiving and retaining the pin F, secured to the handle in the manner described for the purpose specified.

ANNA EDDOWES.

Witnesses:
THOS. J. EDDOWES,
MARGT. E. WEST.